(12) United States Patent
Ernst

(10) Patent No.: US 6,941,694 B2
(45) Date of Patent: Sep. 13, 2005

(54) FISHING ROD HOLDER

(75) Inventor: Matthew J. Ernst, North Oaks, MN (US)

(73) Assignee: Carter Day International, Inc., Minneapolis, MN (US)

( * ) Notice: Subject to any disclaimer, the term of this patent is extended or adjusted under 35 U.S.C. 154(b) by 0 days.

(21) Appl. No.: 10/445,125

(22) Filed: May 23, 2003

(65) Prior Publication Data

US 2003/0217500 A1 Nov. 27, 2003

Related U.S. Application Data

(63) Continuation-in-part of application No. 10/087,077, filed on Feb. 28, 2002, now Pat. No. 6,637,146
(60) Provisional application No. 60/272,230, filed on Feb. 28, 2001.

(51) Int. Cl.[7] .......................... A01K 97/10; A01K 97/12
(52) U.S. Cl. ............................................. 43/21.2; 43/17
(58) Field of Search .................... 43/17, 21.2; 248/514, 248/518, 291.1, 29.3, 538

(56) References Cited

U.S. PATENT DOCUMENTS

| | | | |
|---|---|---|---|
| 1,025,657 A | | 5/1912 | Towne |
| 2,459,549 A | | 1/1949 | Smith |
| 2,692,106 A | | 10/1954 | Hermann |
| 2,711,300 A | | 6/1955 | Nelson |
| 3,246,885 A | | 4/1966 | Letimer |
| 3,835,568 A | * | 9/1974 | Whitfield ........................ 43/17 |
| 3,835,588 A | | 9/1974 | Whitfield |
| 3,992,798 A | * | 11/1976 | Schmitt, Sr. .................... 43/17 |
| 4,366,640 A | * | 1/1983 | Clapp .......................... 43/21.2 |
| 4,827,654 A | | 5/1989 | Roberts |
| 4,901,970 A | | 2/1990 | Moss et al. |
| 4,948,083 A | | 8/1990 | McNaney, Jr. et al. |
| 5,119,580 A | * | 6/1992 | Schulte et al. ............... 43/19.2 |
| 5,295,321 A | * | 3/1994 | Matura ........................ 43/21.2 |
| 5,570,532 A | * | 11/1996 | Shaffer et al. .................. 43/17 |
| 5,735,499 A | | 4/1998 | Phillips et al. |
| 6,003,746 A | | 12/1999 | Richardson |
| 6,088,946 A | | 7/2000 | Simmons |
| 6,112,449 A | | 9/2000 | Blackwell |
| 6,213,441 B1 | | 4/2001 | Baynard et al. |
| 6,637,146 B2 | * | 10/2003 | Ernst .......................... 43/21.2 |

OTHER PUBLICATIONS

Three (3) sheets of photos of fishing rod holders. Date unknown.

* cited by examiner

*Primary Examiner*—Kurt Rowan
(74) *Attorney, Agent, or Firm*—Fredrikson & Byron, P.A.

(57) ABSTRACT

A fishing rod holder with a strike sensor that alerts the operator that a fish has been caught. The fishing rod holder allows for horizontal striking of fish either while trolling or still-fishing. The fishing rod holder consists of a rod holder support arm assembly, a rotating unit, a base unit and an optional mounting adapter. The rod holder may be mounted for horizontal striking on the top surface of a gunnel wall on a boat or other substantially flat horizontal surface. Alternatively, the mounting adapter may be used to mount the rod holder to a boat handle rail. The rod holder support arms are slidably engaged in the support arm assembly and allow for customized vertical orientation of the rod's tip with respect to the reel. In addition, the horizontal orientation of the rod may be customized to accommodate fishing technique and fishing conditions. Finally, there is a strike sensor to alert the operator that a fish has been caught.

7 Claims, 7 Drawing Sheets

FISHING ROD HOLDER

PROVISIONAL APPLICATION DATA

The present application claims priority to U.S. Provisional Patent Application No. 60/272,230, filed Feb. 28, 2001 entitled FISHING ROD HOLDER, naming Matthew J. Ernst as inventor and is incorporated by reference as if fully set forth herein.

CROSS-REFERENCE TO RELATED APPLICATIONS

The present application is a continuation-in-part application of U.S. patent application Ser. No. 10/087,077, filed Feb. 28, 2002 now U.S. Pat. No. 6,637,146 entitled FISHING ROD HOLDER, naming Matthew J. Ernst as inventor and is incorporated by reference as if fully set forth herein.

FIELD OF THE INVENTION

This invention relates generally to fishing pole holders that may be used to strike a fish while trolling in a boat or while still-fishing.

BACKGROUND OF THE PRESENT INVENTION

Fishing rod holders are historically used to aid anglers and facilitate their ability to fish while performing other tasks. Current fishing rod holders require the operator to either remove the rod to strike the fish or strike the fish in a vertical manner while the rod is in the holder. Because both of these methods are inefficient and ineffective, there is a need for a fishing rod holder that allows the operator to strike the fish using the more natural and more effective horizontal motion while the fishing rod is in the holder. In addition, current rod holders do not incorporate a sensor that alerts the operator when a fish is on the line.

SUMMARY OF THE INVENTION

A fishing rod holder with an alarm sensor that notifies the operator when a fish is on the line and then allows the operator to horizontally strike the fish either while trolling or still-fishing. The fishing rod holder consists of a rod holder support arm assembly, a rotating unit, a base unit and an optional mounting adapter. The rod holder may be mounted for horizontal striking on the top surface of a gunnel wall on a boat or any other substantially flat horizontal surface. Alternatively, the mounting adapter may be used to mount the rod holder to a boat handle rail. The rod holder support arms are slidably engaged in the support arm assembly and allow for selectable vertical orientation of the rod's tip with respect to the reel. In addition, the horizontal orientation of the rod may be selectable to accommodate fishing technique and fishing conditions.

A principal object and advantage of the present invention is to alert the operator when a fish is on the line.

A principal object and advantage of the present invention is to allow horizontal striking of fish and ease of removal of the rod from the rod holder following a strike while either trolling or still-fishing.

Another principal object and advantage of the present invention is to allow the rod to be selectably-oriented in the vertical plane as well as the horizontal plane, depending on the fishing technique selected and the conditions.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
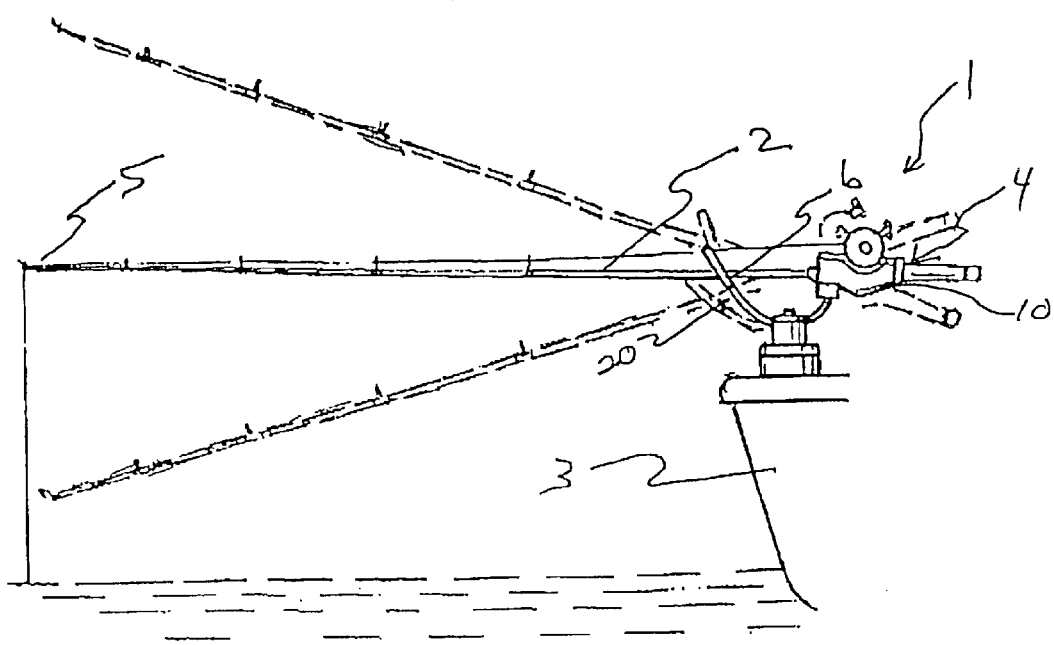
FIG. 1 is a side view of the apparatus in operation while attached to a boat gunnel wall.
Figure 2:
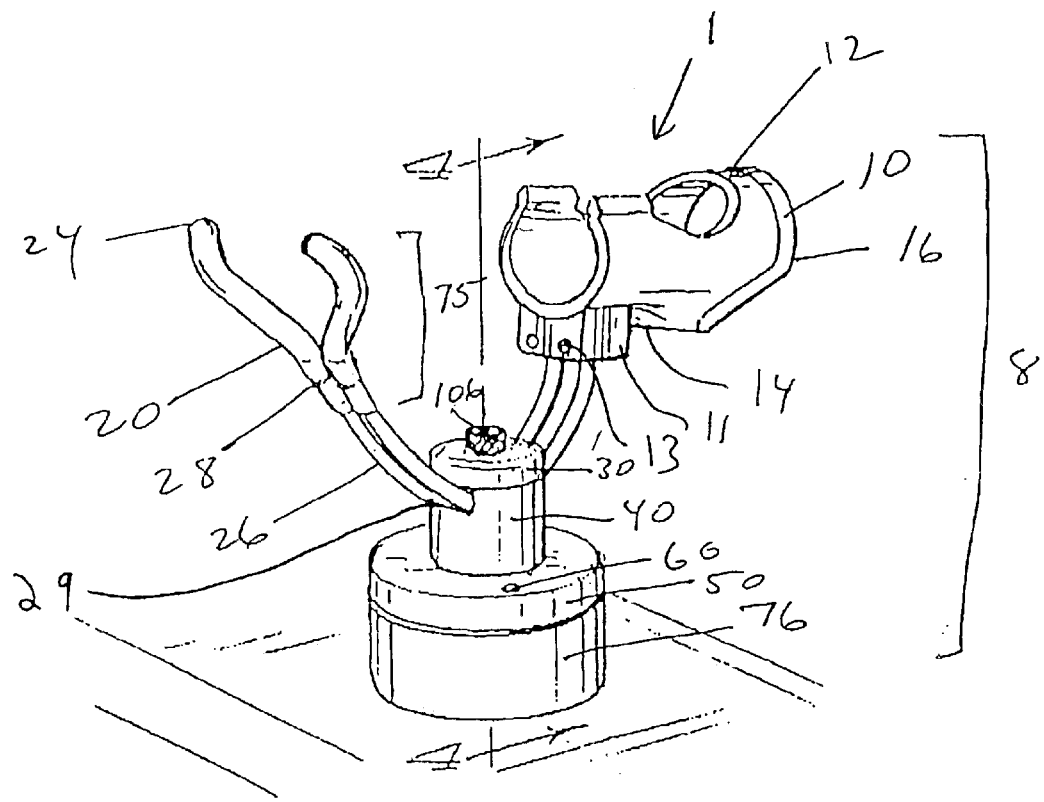
FIG. 2 is a perspective view of the apparatus attached to a horizontal surface such as a boat gunnel wall.

With reference to FIGS. 1 and 2, a fishing rod 2 is shown secured within the fishing rod holder 1. The fishing rod holder 1 is shown attached to a boat 3. The fishing rod holder 1 comprises a rod holder support arm assembly 8, a rotating unit 50 and a base unit 76.

The rod holder support arm assembly 8 further comprises a sleeve holder 10 and support arms 20, a rod cap holder 30 and a support arms base 40. The sleeve holder 10 is fixedly attached to an adaptor 11. The adaptor 11 is fixedly attached to the proximal end 22 of the support arms 20. The method for attaching the sleeve holder 10 to the adaptor 11 and the adaptor 11 to the support arms 20 are well known in the art and include rivets, screws and other similar means. The support arms 20 are parallel to one another, are substantially smooth, and the central sections 26 thereof are bent upward resulting in a substantially curvelinear profile. The support arms 20 are fixedly attached to each other near the distal end 24 of the arms to prevent motion of the arms relative to one another, forming a joint 28. The arms 20 may be joined by various means known in the art including, for example, welding or threaded screws. The distal end 24 of the arms 20 are shaped to ease the insertion of the fishing rod 2 into the support arms 20. In addition, the distal ends 24 of the arms 20 are coated 25 to prevent corrosion and wear of the metal surface resulting from water and continuous contact with the fishing rod 2.

Figure 3:
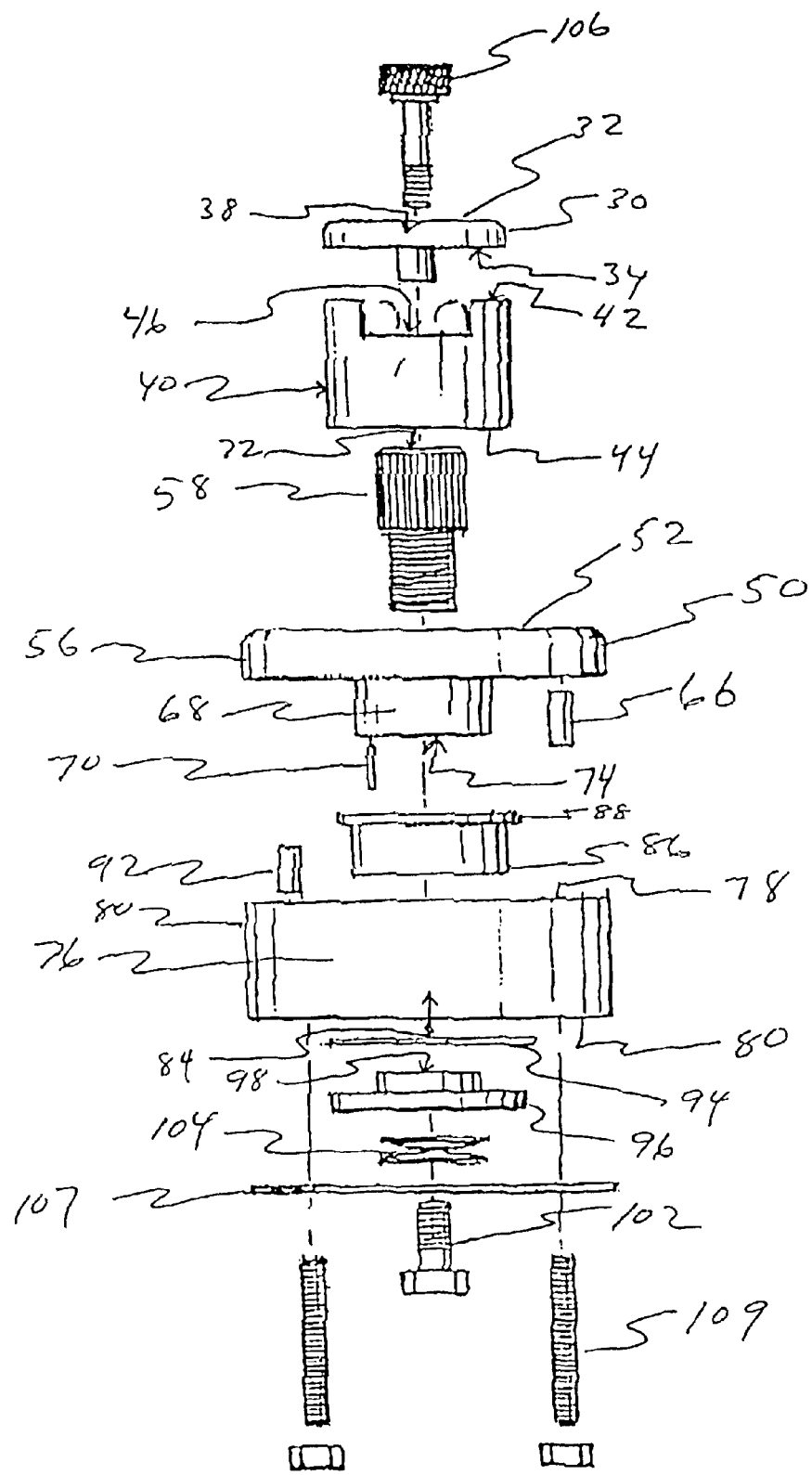
FIG. 3 is an exploded view of the apparatus.
Figure 4:
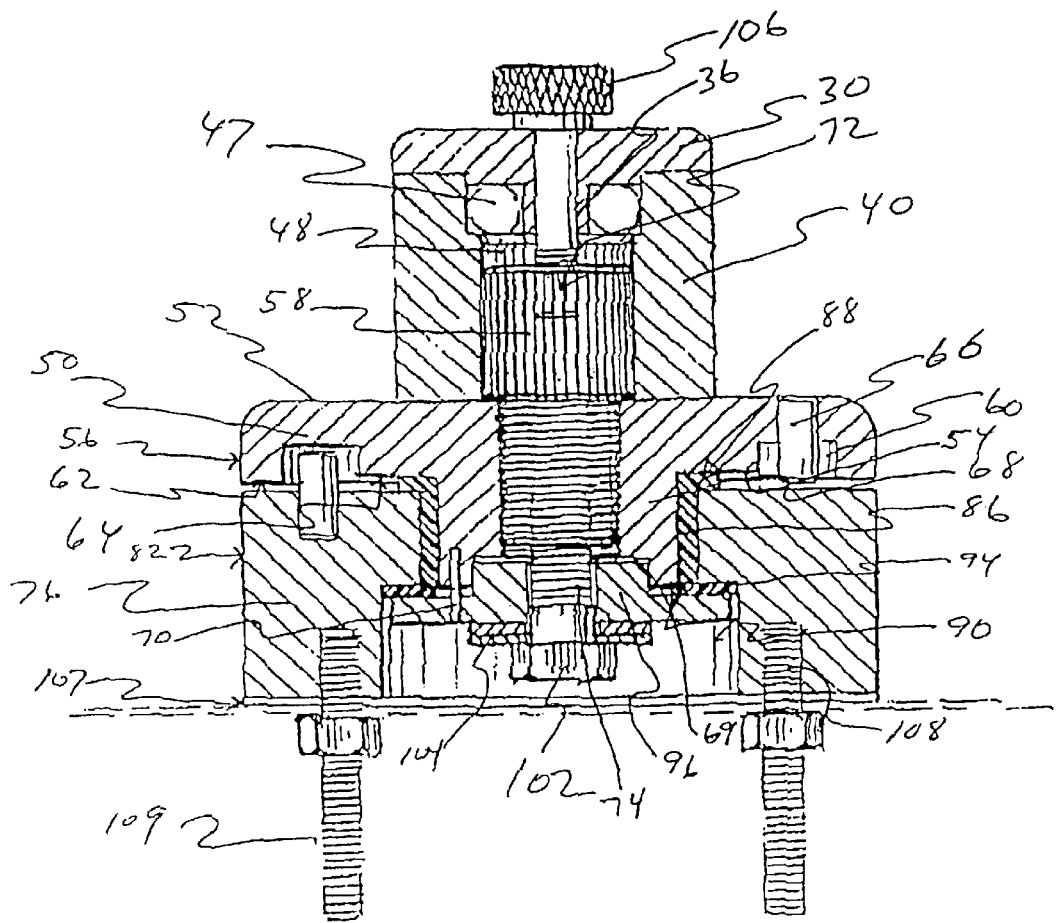
FIG. 4 is a cross-sectional view of the apparatus.

Referring now to FIGS. 2–4, the support arms base 40 has a substantially cylindrical profile and a splined central bore 48. It is understood that the cylindrical form is aesthetic and not functional. As a result, a wide variety of profiles may be selected. A transverse groove 46 is disposed across the top surface 42 of the support arms base 40. The width of the transverse groove 46 is substantially equivalent to the diameter of the splined central bore 48.

As shown in the embodiment of FIG. 2, an arm support holder 29 comprises rod cap holder 30 and support arms base 40. The rod cap holder 30 comprises a transverse lip 36 disposed along a bottom surface 34. When the rod cap holder 30 engages the support arms base 40, the transverse lip 36 engages the support arms base 40, forming two transverse channels 47 that slidably capture the support arms 20 between the rod cap holder 30 and the support arms base 40. The rod cap holder 30 has a substantially smooth central bore 38 through which a thumb screw 106 or other fastening device is disposed. When the mounting post 58 on the rotating unit 50 is engaged with the splined shaft 48 of the support arms base unit 40, the arms support assembly 8 is secured to the rotating unit 50 by threadably engaging the thumb screw 106 that extends from the rod cap holder 30 to the threaded central bore 72 of the mounting post 58. This screw 106 may be loosened to allow adjustment of the vertical orientation of the fishing rod 2 by sliding the support arms 20 forward or backward in the transverse channels 47 of the support arms assembly 8. The thumb screw 106 is then tightened to retain the support arms 20 in the desired orientation.

The rotating unit 50 has a substantially cylindrical profile and further comprises a mounting post 58 fixedly attached to substantially the center of the top surface 52 of the rotating unit 50. The mounting post 58 has a threaded central bore 72 and a splined profile section. A rotational stop pin channel 60 is circumferentially disposed on the bottom surface 54 of the rotating unit 50 forming an outer lip 62 and an inner lip 64. A rotational stop pin 66 is fixedly mounted in the rotational stop pin channel 60. The lower portion of rotating unit 50 comprises a substantially smooth lower cylinder 68. An anti-rotate pin 70 is fixedly attached to the bottom surface 69 of the lower cylinder 68. The lower cylinder 68 has a threaded central bore 74.

The base unit 76 comprises a central bore 84 extending therethrough. The diameter of the central bore 84 widens approximately halfway though base unit 76, forming a central bore lip 90 when viewed from the bottom. The central bore 84 is partially lined with a flange bearing 86 that extends, and includes a flange lip 88, above the top surface 78 of the base unit 76. The flange bearing 86 may be composed of Teflon or any similar material that allows for minimal rotational friction. When lined with the flange bearing 86, the central bore 84 rotatably engages the lower cylinder 68 on the bottom surface 54 of the rotating unit 50. The base unit 76 further comprises a rotational stop pin 92 extending from the top surface 78. The stop pin 92 is circumferentially positioned to move within rotational stop pin channel 60, allowing for rotational contact between stop pin 66 and rotational stop pin 92 during operation.

A thrust bearing 94 is disposed on the central bore lip 90 and may be composed of Teflon or other friction-minimizing material. The thrust bearing 94 is held in place by a bearing retainer 96. The bearing retainer 96 has a substantially smooth central bore 98 through which a retaining bolt 102 is disposed and an aperture 100 that receives the anti-rotate pin 70, stopping the complete rotation of the rotating unit 50 and preventing the retaining bolt 102 from backing out during operation. The retaining bolt 102 threadably engages the threaded central bore 74 in the rotating unit's lower cylinder 68 thereby biasing the bearing retainer 96 against the thrust bearing 94 and connecting the base unit 76 to the rotating unit 50. The horizontal rotational tension is adjusted by tightening or loosening the retaining bolt 102. Compression washers 104 or other similar biasing means are used in conjunction with the retaining bolt 102 to provide the spring resistance necessary to offer minimal friction on the flange bearing 86 during rotation of the rotating unit 50. The bottom surface 80 of the base unit 76 has a plurality of threaded holes 108 to be used for mounting to a flat surface, using mounting screws 109 or similar means, or for attaching the mounting adaptor 111.

Figure 5:
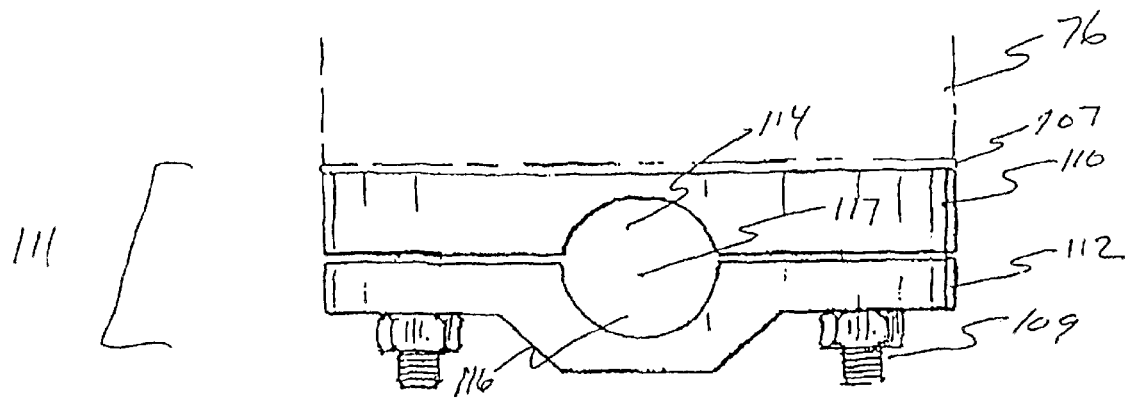
FIG. 5 is a side elevation view of the mounting adaptor.

Referring now to FIG. 5, the mounting adaptor 111 is comprised of a top member 110 and a bottom member 112. The top and bottom members 110 and 112 together form a substantially cylindrical cavity 117 capable of securely fastening the fishing rod holder to boat handle rails or other similar structures. It is understood that in practice the cavity profile can take on virtually any shape as long as it is capable of fastening to boat handle rails or other similar structures. The top 110 and bottom 112 members are secured to the appropriate structure using mounting screws 109 or similar fastening means.

Figure 6:
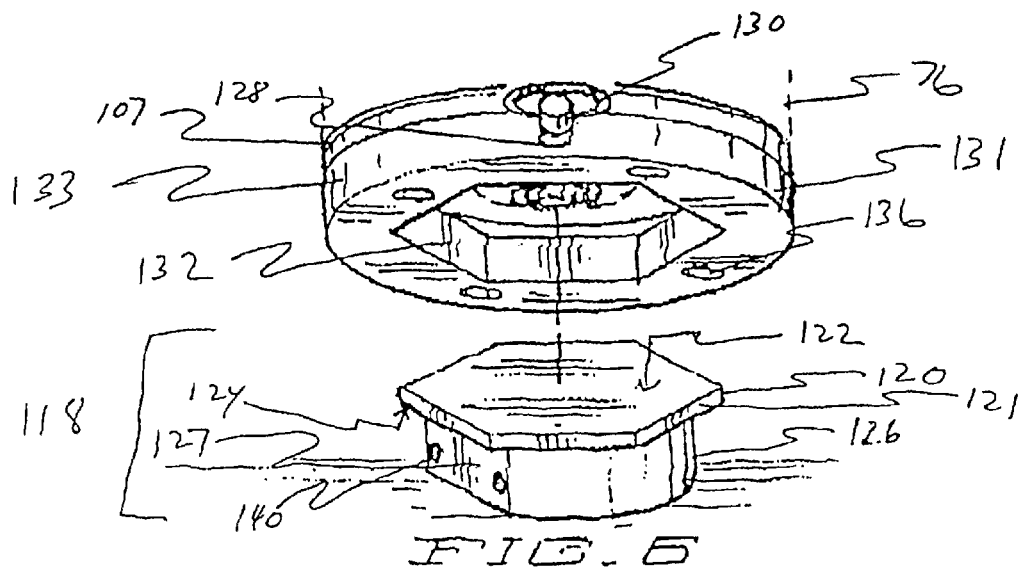
FIGS. 6–8 are perspective, top elevation, and side elevation views, respectively, of the quick-mount feature of the apparatus.
Figure 7:
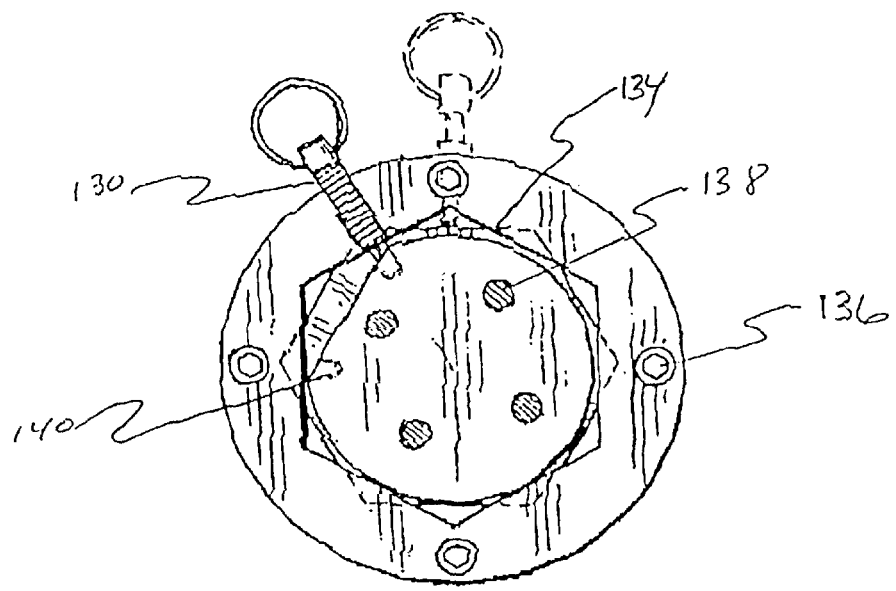
Figure 8:
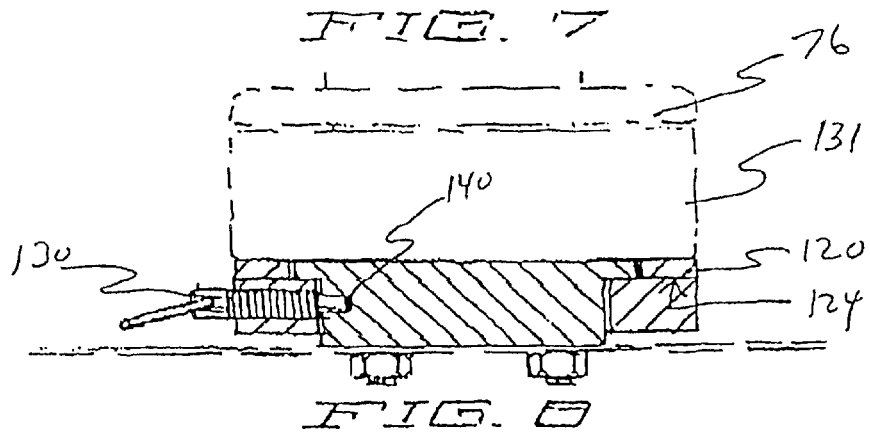

An alternate embodiment of the apparatus allowing for quick mounting and directional biasing of the fishing rod holder is provided for in FIGS. 6–8. This embodiment requires a mounting block 118 with a top section 120 having a polygonal profile 134 with a diameter greater than that of the bottom section 126. The side surface 127 of the bottom section 126 of the mounting block 118 further has a plurality of apertures 140.

This embodiment includes a quick-mount adaptor 131 that is fixedly attached to the bottom surface 80 of the base unit 76. The adaptor has a polygonal profile cavity 132 that matches the profile of the top section 120 of the mounting block 118 and which nonrotatably slidably engages the top section 120 of the mounting block 118. When fully engaged, the top surface 122 of the mounting block 118 is substantially disposed against the bottom surface 80 of the base unit 76 and the sides 132 of the polygonal profile of the quick mount adaptor 131 are nonrotatably engaged with the side surfaces 121 of the top section 120 of the mounting unit 118. A plurality of threaded holes 136 are disposed in the quick-mount adaptor 131 for fastening the adaptor 131 to the bottom of the base unit 76. A mounting gasket 107 is further disposed between the adaptor 131 and the bottom of the base unit 76. In addition, at least one aperture 128 is provided on the side surface 133 of the quick-mount adaptor 131. This aperture 128 is used to secure the fishing rod holder when the apparatus is engaged with the mounting unit 118 by insertion of a fastening device such as a key or pin 130 as shown in FIGS. 7–8. The pin 130 engages the aperture 128 on the quick-mount adaptor 131 and the aperture 140 disposed on the side surface 127 of the bottom section 126 of the mounting unit 118.

Figure 10:
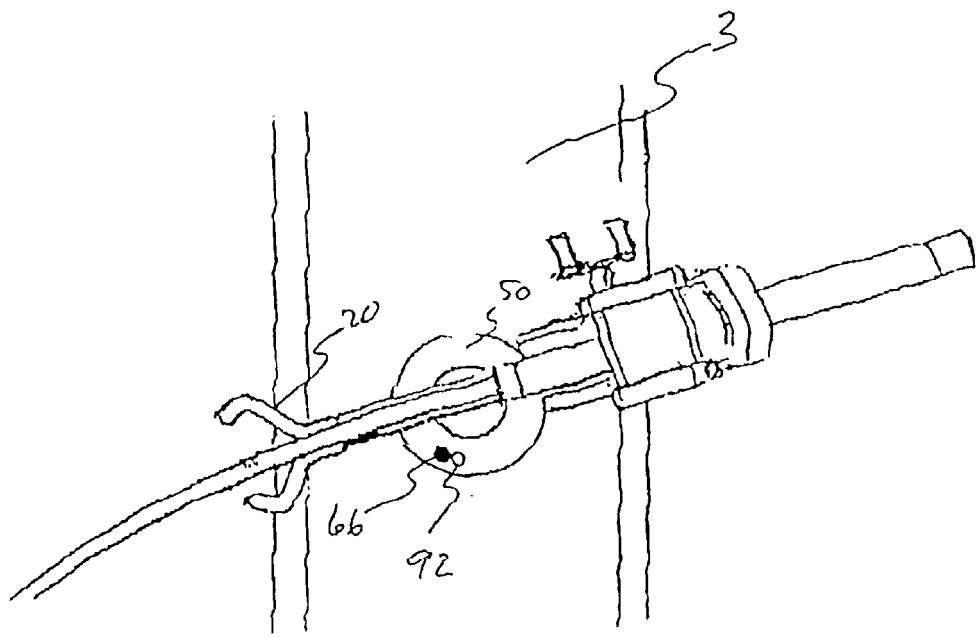
Figure 11:
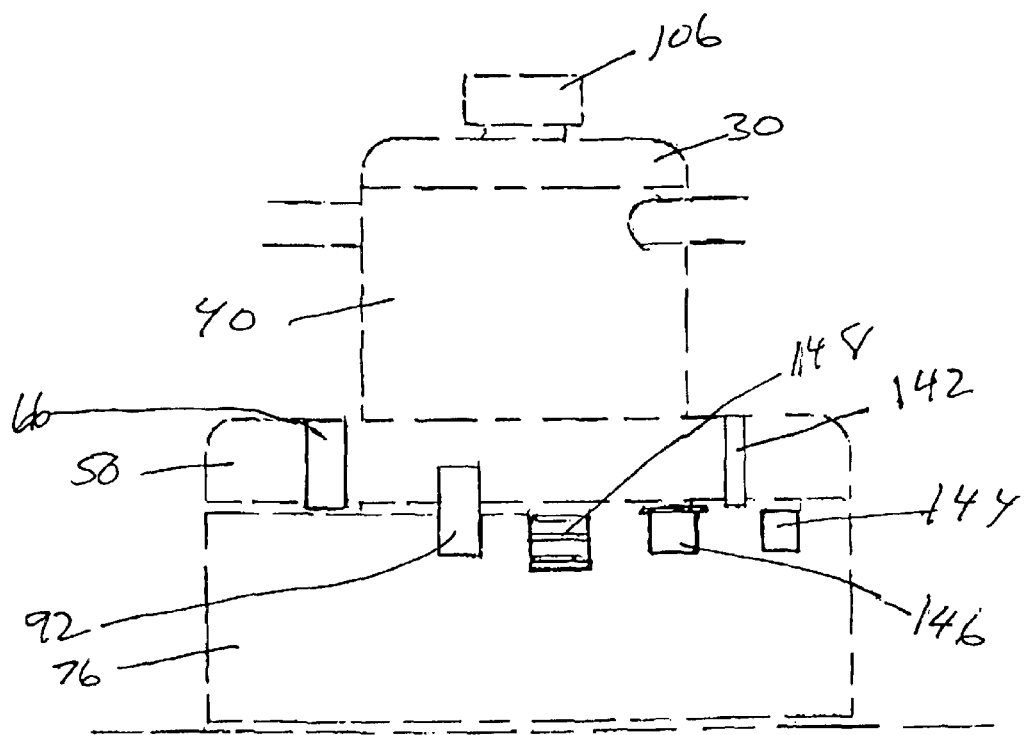
FIG. 11 is an elevation view, corresponding with FIG. 9, showing the strike sensor alarm components.
Figure 12:
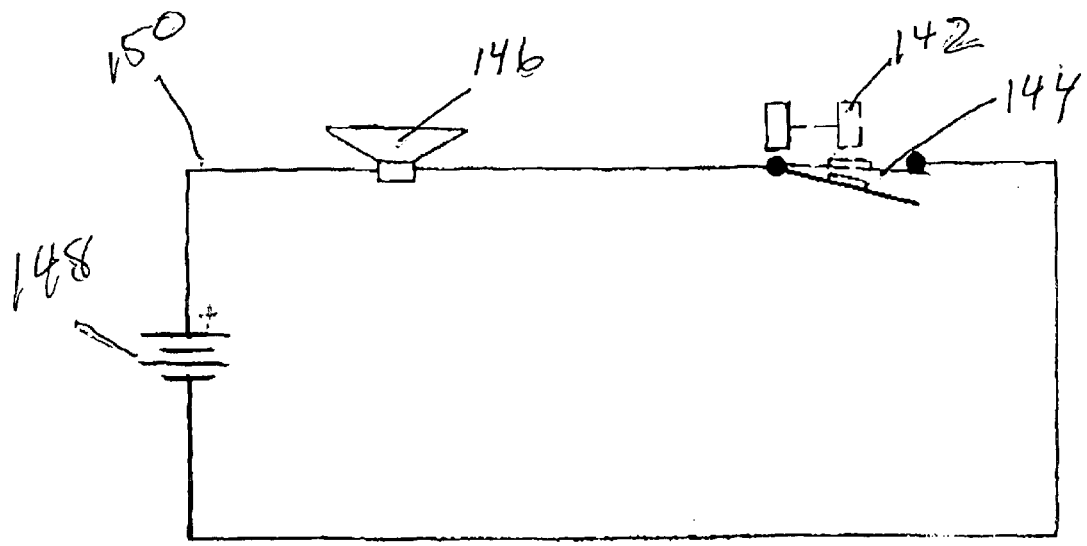
FIG. 12 is a schematic diagram of the strike sensor alarm.

Turning now to FIGS. 11–14, the strike sensor will be discussed. The configuration of elements in FIGS. 11 and 13 correspond directly to those illustrated in FIG. 9. In addition, the configuration of elements in FIG. 14 correspond directly to those illustrated in FIG. 10. The strike sensor allows the operator to detect when a fish is on the line from a location remote from the fishing rod 1. The strike sensor comprises a sensor magnet 142 mounted in the rotating unit 50, a reed switch 144 disposed in the base unit 76, and an alarm 146 disposed in the base unit 76. In the preferred embodiment, the alarm provides a sound to alert the operator. FIG. 12 illustrates the schematic circuit for the strike sensor wherein the sensor magnet 142 is located proximal to the reed switch 144 with the reed switch still in the open position.

Figure 13:
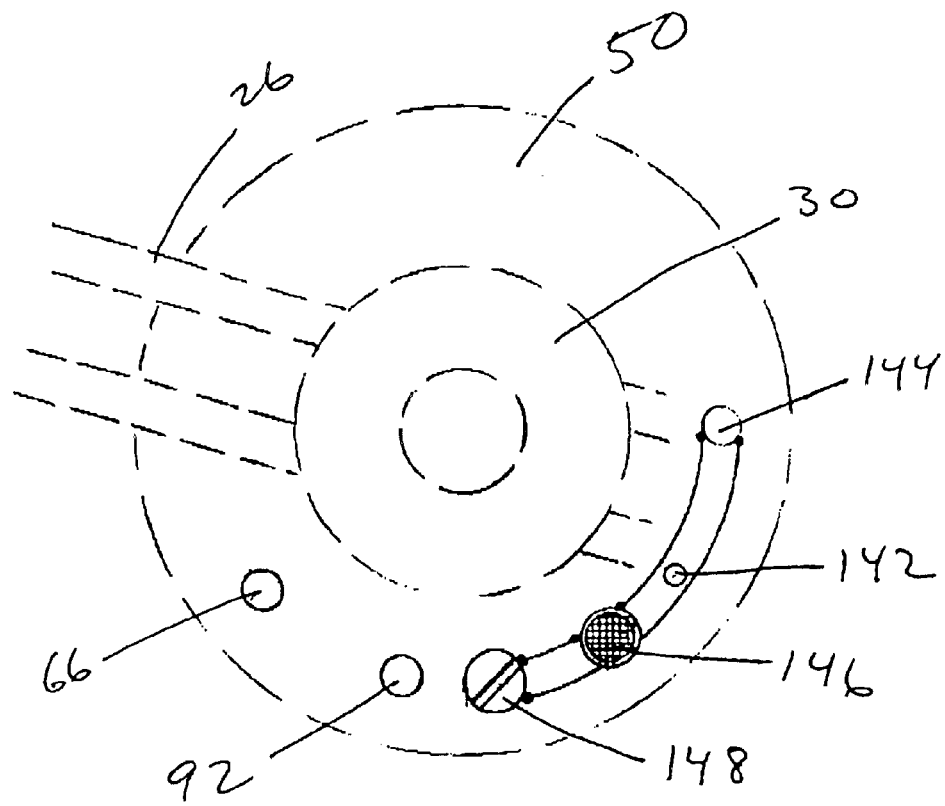
FIG. 13 corresponds with FIGS. 9 and 11 and is a top plan view illustrating the strike sensor circuit in the open position.
Figure 14:
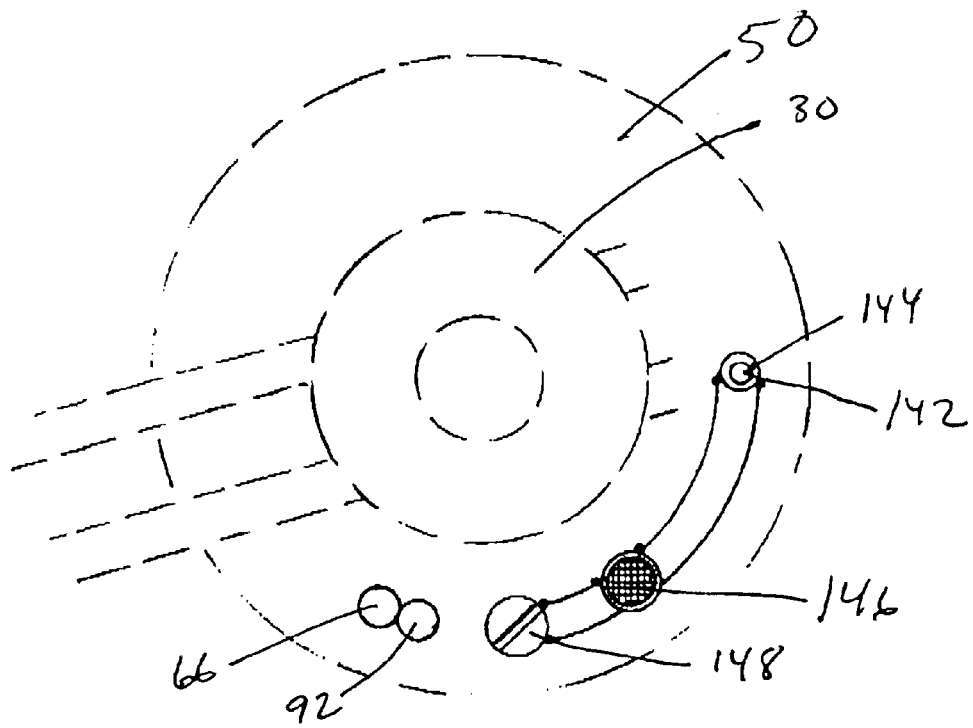
FIG. 14 corresponds with FIG. 10 and is a top plan view illustrating a closed strike sensor circuit.

The strike sensor may be used when fishing using either a forward or backward trolling technique. FIG. 13 illustrates this configuration. When a fish strikes, the fishing rod holder is caused to rotate in the direction opposite the trolling boat until the rotating unit rotational stop pin 66 contacts the base unit rotational stop pin 92. As seen in FIG. 14, this places the sensor magnet 142 in proximity to the reed switch 144, preferably directly over the top of the switch, which is normally in the open position, thus closing the circuit 150 and causing the battery-driven alarm 146 to sound.

Operation of the Present Invention

With the foregoing description of the present invention, its operation can now be fully explained.

With reference to FIGS. 1 and 2, the butt end 4 of the fishing rod 2 is received by the sleeve holder 10 and the rod 2 is allowed to rest against the conjunction 28 of the support arms 20. The vertical orientation of the tip 5 of the rod 2 with respect to the butt end 4 can be adjusted by loosening the thumb screw 106 and sliding the support arms 20 forwardly within the transverse channels 47 of the support arms assembly 8 or rearwardly to decrease the height of the rod tip 5. The fishing rod 2 can be oriented in a substantially vertical position by sliding the support arms 20 completely forward, bringing the adaptor 11 into contact with the support arms assembly 8. Conversely, the rod tip 5 may be oriented below the butt end 4 of the rod 2 in a less than horizontal position by sliding the support arms 20 back until the conjunction 28 between the support arms 20 is contacted by the support arms assembly 8. Thus, the rod tip 5 may be oriented vertically in any position between these two extremes relative to the butt end 4 of the rod 2. Once the desired rod orientation has been established, the thumb screw 106 is then retightened, fixedly retaining the support arms 20 in the support arms assembly 8. In this manner, the support arms 20 are captured in the transverse channels 47 created by the rod cap holder 30 and the support arms base 40. The thumb screw 106 is threadably engaged with the threaded central bore 72 of the rotating unit's splined mounting post 58.

With the vertical orientation of the fishing rod holder established, the fishing rod holder's horizontal orientation may now be described. There are three elements that provide customization of horizontal orientation. First, as indicated by FIGS. 6–8, the mounting block 118 and the interior side surfaces 132 of the quick-mount adaptor 131 have slidably engageable and complementary profiles. This allows quick-mount adaptor 131 to be disengaged by removing the pin 130, rotating the adaptor 131 such that the rod 2 is directed over the fishing area and the adaptor 131 reengaged with the mounting block 118 and resecured with the pin 130. Second, the engagement of the splined profile located in the central bore 48 of the support arms base 40 with the mounting post 58 of the rotating unit 50 allows the operator to orient the fishing rod holder using a full 360 degrees of horizontal motion. The transverse channels 47 created by the rod cap holder 30 and the support arms base 40 allows for two directional positions, 180 degrees from each other, for the fishing rod 2 at any given splined engagement. The third component available to establish proper horizontal orientation of the fishing rod 2 involves the rotational stop pin 92 on the base unit 76. The rod holder apparatus may be rotated approximately 355 degrees in either direction from the rotational stop pin 92 on the base unit 76. This pin 92 determines where the fishing rod holder's rotation will be stopped as it contacts the rotational stop pin 66 on the rotating unit 50.

Figure 9:
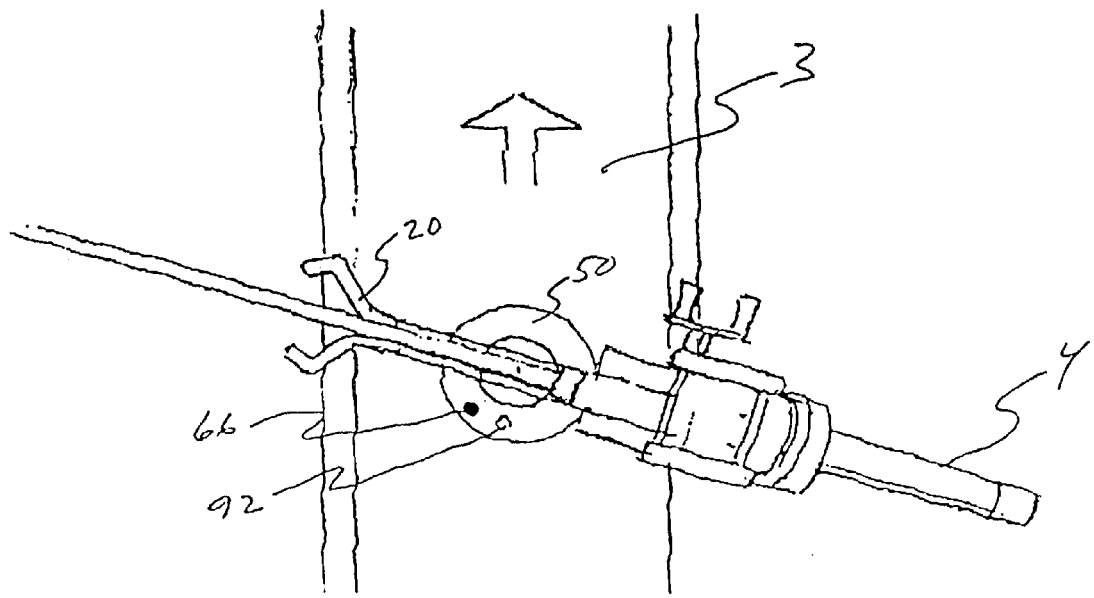
FIGS. 9 and 10 are top views showing the apparatus installed on a boat gunnel wall while the boat is trolling.

If trolling, the apparatus is preferably mounted with the base unit's rotational stop pin 92 oriented substantially as shown in FIGS. 9 and 10. The arrow in FIG. 9 indicates the direction of travel of the boat 3. The transverse channel 47 in the support arms assembly 8 is oriented to allow the rod 2 to be held out over the water. The rod 2 is free to rotate in the direction opposite that of the moving boat 3 until the rotating unit's rotational stop pin 66 and the base unit's rotational stop pin 92 come into contact, preventing further horizontal rotation. However, if the strike sensor is used, it is preferable to troll with the rod holder configured such that the rotating unit's rotational stop pin 66 and the base unit's rotational stop pin 92 are not in contact as in FIG. 9. This horizontal position is attained by adjusting the horizontal rotational tension of the fishing rod holder by tightening or loosening the retaining bolt 102 as indicated in FIGS. 3 and 4

FIGS. 11–14 illustrate the strike sensor which alerts the operator when a fish is on the line. Generally, as noted, the rod holder 1 is used while trolling in either a forward or backward trolling motion. Referring particularly to FIGS. 11 and 13, the orientation of the fishing rod holder as illustrated in both Figures corresponds to that of FIG. 9 to illustrate the sensor component positioning when in the trolling position. In this instance, the rotational unit's rotational stop pin 66 and the base unit's rotational stop pin 92 are not in contact and the strike sensor is not activated.

Activation of the strike sensor by closing the circuit 150 is illustrated in FIG. 14. When a fish strikes, the fishing rod holder rotates horizontally until the rotational stop pin 66 of the rotating unit 50 contacts the rotational stop pin 92 of the base unit 76. In this configuration, the magnet 142 is positioned proximally, preferably directly over, the reed switch 144. The reed switch 144 is normally in the open position, as indicated in FIG. 12. When the magnet 142 is positioned over the reed switch 144, the switch closes, creating a closed circuit 150 which causes the alarm to sound, notifying the operator that a fish has been hooked. The reed switch 144 then closes in response to the magnetic field, completing the circuit 150 and allows the current from the battery source 148 to flow to the alarm 146. The use of a reed switch 144, embedded within the assembled fishing rod holder, eliminates the need for any external switches. In addition, placing the sensor components within the fishing rod holder renders the strike sensor virtually waterproof and splash resistant.

The horizontal rotational tension of the fishing rod holder is adjusted by tightening or loosening the retaining bolt 102 which is shown in FIGS. 3 and 4. This feature is important for two reasons. First, since the drag of the fishing line and the bait attached thereto during trolling tends to cause the fishing rod holder to rotate horizontally, a certain horizontal rotational tension is necessary to counteract the force of the water during the trolling action in order to prevent the rod holder from simply rotating such that the rotating unit rotational stop pin 66 and the base unit rotational stop pin 92 come into contact. This enables the operator to take into account trolling speed, the type of fishing, e.g., fishing in contact with the bottom, and external weather and water conditions. This lessens the likelihood of obtaining a "false positive" strike alarm. Second, the horizontal rotational tension can used to fine tune the alarm sensitivity depending on the type of fishing lure that is being used. By way of example, a large bill bait may require a more resistance to horizontal rotation than would a small billed bait to account for the difference in drag between the two types of bait.

Generally, when a fish is detected, the operator may strike the fish in a horizontal manner by rotating the apparatus as described herein. The fishing rod may then be quickly, easily and smoothly removed from the apparatus at any time to facilitate reeling the fish in.

The above specification describes certain preferred embodiments of this invention. This specification is in no way intended to limit the scope of the claims. Other modifications, alterations, or substitutions may now suggest themselves to those skilled in the art, all of which are within the spirit and scope of the present invention. It is therefore intended that the present invention be limited only by the scope of the attached claims below.

What is claimed is:

1. A fishing rod holder, comprising:
   a support arm assembly, including a sleeve holder and one or more support arms for holding a fishing rod;
   an arm support holder that slidably engages the support arms to allow vertical orientation of the fishing rod;
   a rotating unit connected to the arm support holder;
   a base unit rotatably engaged with the rotating unit, the rotating unit being capable of free horizontal rotation relative to the base unit; and
   a strike sensor disposed within the rotating unit and base unit.

2. The fishing rod holder of claim 1 wherein the rotating unit is capable of approximately 355 degrees of free horizontal rotation relative to the base unit.

3. The fishing rod holder of claim 1, wherein the rotating unit further comprises a bottom surface wherein a circumferential channel is disposed thereon and a rotating unit rotational stop pin disposed within the circumferential channel.

4. The fishing rod holder of claim 3, wherein the base unit further comprises a top surface and a base unit rotational stop pin extending from the top surface such that the base unit rotational stop pin slidably engages the circumferential channel of the rotating unit when the base unit and the rotating unit are engaged, the rotating unit being capable of free horizontal rotation relative to the base unit until the rotating unit rotational stop pin and the base unit rotational stop pin are in contact.

5. The fishing rod holder of claim 1, wherein the strike sensor comprises a circuit, the circuit consisting of:
   a direct current battery source disposed in the base unit;
   a reed switch electrically connected to the battery source;
   a sensor magnet disposed in the rotating unit, the sensor magnet being capable of being positioned in vertical proximity to the reed switch; and
   an alarm electrically connected to the battery source and the reed switch, the alarm receiving current when the reed switch closes.

6. The fishing rod holder of claim 1 further comprising a mounting adaptor, the adaptor fixedly attached to the base unit, the adaptor being capable of adjusting the horizontal positioning of the fishing rod holder.

7. A fishing rod holder comprising:
   a support arm assembly including a sleeve holder and one or more support arms for holding a fishing rod;
   an arm support holder that slidably engages said support arms to allow vertical orientation of the fishing rod;
   a rotating unit connected to the arm support holder, the rotating unit having a bottom surface wherein a circumferential channel is disposed thereon, a rotating unit rotational stop pin being mounted within the circumferential channel;
   a base unit that rotatably engages the rotating unit, the base unit having a top surface and a base unit rotational stop pin extending from the top surface such that the base unit rotational stop pin slidably engages the circumferential channel of the rotating unit when the base unit and the rotating unit are engaged, the rotating unit being capable of approximately 355 degrees of free horizontal rotation relative to the base unit, the rotation stopped when the rotating unit rotational stop pin and the base unit rotational stop pin are in contact;
   a mounting adaptor, fixedly attached to the base unit, the mounting adaptor being capable of adjusting the horizontal positioning of the fishing rod holder; and
   a strike sensor comprised of a circuit, the circuit consisting of:
      a direct current battery source disposed in the base unit;
      a reed switch electrically connected to the battery source;
      a sensor magnet disposed in the rotating unit, the sensor magnet being capable of being positioned in vertical proximity to the reed switch; and
      an alarm electrically connected to the battery source and the reed switch, the alarm receiving current when the reed switch closes.

* * * * *